(12) United States Patent
Beard et al.

(10) Patent No.: US 10,010,843 B2
(45) Date of Patent: Jul. 3, 2018

(54) MIXING AND DISTRIBUTION DEVICE COMPRISING A DISTRIBUTION PLATE WITH PERIPHERAL OPENINGS

(71) Applicant: IFP Energies Nouvelles, Rueil-Malmaison (FR)

(72) Inventors: Philippe Beard, Saint Genis-Laval (FR); Frederic Bazer-Bachi, Irigny (FR); Cecile Plais, Les Haies (FR); Frederic Augier, Saint Symphorien D Ozon (FR); Yacine Haroun, Etats-Unis (FR)

(73) Assignee: IFP Energies Nouvelles, Rueil-Malmaison (FR)

( * ) Notice: Subject to any disclaimer, the term of this patent is extended or adjusted under 35 U.S.C. 154(b) by 69 days.

(21) Appl. No.: 15/084,669

(22) Filed: Mar. 30, 2016

(65) Prior Publication Data

US 2016/0288072 A1    Oct. 6, 2016

(30) Foreign Application Priority Data

Apr. 1, 2015 (FR) ...................... 15 52784

(51) Int. Cl.
   *B01J 8/04* (2006.01)
   *B01J 8/02* (2006.01)

(52) U.S. Cl.
   CPC .......... *B01J 8/0446* (2013.01); *B01J 8/0278* (2013.01); *B01J 8/0453* (2013.01); *B01J 8/0492* (2013.01);
   (Continued)

(58) Field of Classification Search
   CPC . B01J 8/04; B01J 8/0492; B01J 8/0446; B01J 8/0453; B01J 8/0496;
   (Continued)

(56) References Cited

U.S. PATENT DOCUMENTS

| 8,337,787 B2 | 12/2012 | Augier et al. |
| 2011/0123410 A1 | 5/2011 | Augier et al. |
| 2015/0328610 A1 | 11/2015 | Zahirovic et al. |

FOREIGN PATENT DOCUMENTS

| FR | 2952835 A1 | 5/2011 |
| FR | 2989006 A1 | 10/2013 |
| WO | 2014122073 A1 | 8/2014 |

OTHER PUBLICATIONS

Search Report and Opinion from corresponding French Patent Application No. 1552784 dated Feb. 3, 2016.

*Primary Examiner* — Huy-Tram Nguyen
(74) *Attorney, Agent, or Firm* — Millen, White, Zelano and Branigan, P.C.

(57) ABSTRACT

Device for the mixing and distribution of fluids for a catalytic reactor with a downward flow, said device comprising a collection zone (A), a mixing zone (B) and a distribution zone (C) comprising a distribution plate (12) comprising at least one first zone (C1) supporting a plurality of chimneys (13) and a second zone (C2); said mixing zone (B) is comprised in an annular enclosure (15) situated in the distribution zone (C), said mixing (B) and distribution (C) zones being delimited by at least one annular wall (16) comprising at least one lateral passage section (17a, 17b) suitable for the passage of the fluids from said mixing zone (B) to the first zone (C1) of said distribution zone (C), and the second zone (C2) comprises a plurality of openings (18) suitable for the partial passage of the fluids out of the distribution zone (C).

15 Claims, 4 Drawing Sheets

(52) U.S. Cl.
CPC ............... *B01J 2208/00362* (2013.01); *B01J 2208/00823* (2013.01); *B01J 2208/00893* (2013.01); *B01J 2208/02* (2013.01)

(58) Field of Classification Search
CPC .... B01J 2208/00362; B01J 2208/00849; B01J 2208/00938; B01J 2208/027
USPC ........................................................ 422/632
See application file for complete search history.

MIXING AND DISTRIBUTION DEVICE COMPRISING A DISTRIBUTION PLATE WITH PERIPHERAL OPENINGS

TECHNICAL FIELD

The present invention relates to the field of exothermic reactions and more particularly to hydrotreatment, hydrodesulphurization, hydrodenitrogenation, hydrocracking, hydrogenation, hydrodeoxygenation or also hydrodearomatization reactions carried out in a fixed-bed reactor. The invention relates more particularly to a device for the mixing and distribution of fluids in a reactor with a downward flow and its use for carrying out exothermic reactions.

STATE OF THE ART

Exothermic reactions carried out for example in refining and/or in petrochemistry need to be cooled down by an additional fluid, called quench fluid, in order to avoid a thermal runaway of the catalytic reactor in which they are carried out. The catalytic reactors used for these reactions generally comprise at least one solid catalyst bed. The exothermic nature of the reactions requires the maintenance of a homogeneous temperature gradient within the reactor in order to avoid the presence of hot spots in the catalyst bed contained in the reactor. Zones that are too hot can prematurely reduce the activity of the catalyst and/or lead to non-selective reactions and/or lead to thermal runaways. It is therefore important to have at least one mixing chamber in a reactor, situated between two catalyst beds, which allows a homogeneous temperature distribution of the fluids over a section of the reactor and cooling down of the reaction fluids to a desired temperature.

In order to carry out this homogenization, it is often necessary for a person skilled in the art to use a specific arrangement of often complex internals including the most homogeneous possible introduction of the quench fluid into the section of the reactor. For example, document FR 2 824 495 A1 describes a quench device making it possible to ensure an efficient exchange between the quench fluid(s) and the process fluid(s). This device is integrated in an enclosure and comprises a quench fluid injection pipe, a baffle for collecting the fluids, the quench box proper, operating the mixing between the quench fluid and the downward flow, and a distribution system composed of a perforated tray and a distribution plate. The quench box comprises a deflector ensuring the vortex motion of the fluids in a direction substantially non-radial and non-parallel to the axis of said enclosure and downstream of the deflector, in the direction of circulation of the reaction fluid, at least one outlet passage section for the mixture of fluids formed in the box. This device makes it possible to overcome certain drawbacks of the different systems of the prior art but still has a large space requirement.

In order to overcome the problem of a large space requirement, a device for mixing fluids in a reactor with downward flow has been developed, and is described in the document FR 2 952 835 A1. This device comprises a horizontal collection means provided with a vertical collection line for receiving the fluids, an injection means placed in the collection line and an annular mixing chamber with a circular cross-section situated downstream of the collection means in the direction of circulation of the fluids. The mixing chamber comprises an inlet end connected to the collection line and an outlet end allowing the passage of the fluids, as well as a horizontal pre-distribution plate comprising at least one chimney. The advantage of this device is that it is more compact than that described previously, and makes it possible to ensure good mixing of the fluids and good temperature homogeneity.

A purpose of the invention is to propose a mixing device and a distribution device for fluids which have a small space requirement when they are placed in a catalytic reactor. Another purpose of the present invention is to propose a mixing and distribution device having good efficiency for mixing fluids and having good temperature homogeneity and good distribution.

The Applicant has developed a combined device for the mixing and distribution of fluids, making it possible to significantly reduce the space dedicated to the mixing and distribution of fluids, in particular in a reactor with a downward flow.

SUBJECTS OF THE INVENTION

A first subject of the invention relates to a device for the mixing and distribution of fluids for a catalytic reactor with a downward flow, said device comprising:
  at least one collection zone (A) comprising at least one collection means;
  at least one substantially vertical collection line suitable for receiving a reaction fluid collected by said collection means and at least one injection means opening into said collection line for injecting a quench fluid;
  at least one mixing zone (B), situated downstream of the collection means in the direction of circulation of the fluids, said mixing zone (B) comprising at least one mixing chamber connected to said collection line and an outlet end for removing the fluids;
  at least one distribution zone (C), situated downstream of said mixing zone (B) in the direction of the circulation of the fluids, comprising a distribution plate extending radially over the entire section of the enclosure of the reactor, said distribution plate comprising at least one first zone (C1) supporting a plurality of chimneys and a second zone (C2); characterized in that said mixing zone (B) is comprised in a annular enclosure situated in the distribution zone (C), said mixing (B) and distribution (C) zones being delimited by at least one annular wall comprising at least one lateral passage section suitable for the passage of the fluids from said mixing zone (B) to the first zone (C1) of said distribution zone (C), and in that the second zone (C2) of said distribution zone (C) comprises a plurality of openings suitable for the partial passage of the fluids out of the distribution zone (C).

Advantageously, said annular enclosure is situated at a distance D from the distribution plate comprised between 50 and 200 mm.

Preferably, said annular wall of said annular enclosure is positioned at a distance d2 from the enclosure of the reactor, the distance d2 varying from 2% to 20% of the diameter of the reactor.

Advantageously, said mixing chamber is positioned at a distance d1 from the enclosure of the reactor, said distance d1 being comprised between 5 and 300 mm.

Preferably, the height of said annular enclosure is comprised between 200 and 800 mm.

Advantageously, said annular wall comprises a plurality of lateral passage sections distributed over at least two levels.

Preferably, the annular wall of the annular enclosure is substantially cylindrical.

Advantageously, the cross-section of the mixing chamber is a parallelogram section.

Preferably, the section of the mixing chamber has a ratio between the height "h" of the section and the width "w" of said section comprised between 0.2 and 5.0.

In another embodiment, said mixing chamber has a circular cross-section and is such that the diameter "d" of said mixing chamber is comprised between 0.05 and 0.5 m.

Advantageously, the device according to the invention comprises two mixing chambers.

Preferably, said mixing chamber comprises at least one means for deflecting the fluids, on at least one of the internal walls of said mixing chamber.

Advantageously, the device according to the invention also comprises a dispersal system arranged below said distribution plate, said dispersal system comprising at least one dispersal device.

Advantageously, said mixing (B) and distribution (C) zones are delimited by two annular walls each comprising at least one lateral passage section suitable for the passage of the fluids from said mixing zone (B) to the first zone (C1) of said distribution zone (C).

Another subject of the invention relates to a catalytic reactor with a downward flow comprising an enclosure containing at least two fixed catalyst beds separated by an intermediate zone comprising a device for the mixing and distribution of fluids according to the invention.

BRIEF DESCRIPTION OF THE FIGURES

In FIG. 2, for the sake of clarity, the mixing chamber has not been shown.

DETAILED DESCRIPTION OF THE INVENTION

The compact mixing and distribution device according to the invention is used in a reactor in which exothermic reactions are carried out, such as hydrotreatment, hydrodesulphurization, hydrodenitrogenation, hydrocracking, hydrogenation, or also hydrodearomatization reactions. Generally, the reactor has a shape that is elongated along a substantially vertical axis. At least one reaction fluid (also called "process fluid") is circulated from the top to the bottom of said reactor through at least one catalyst bed. At the outlet of each bed with the exception of the last, the reaction fluid is collected, then mixed with a quench fluid in said device before being distributed to the catalyst bed situated downstream of a distribution plate. Downstream and upstream are defined with respect to the direction of flow of the reaction fluid. The reaction fluid can be a gas or a liquid or a mixture containing liquid and gas; this depends on the type of reaction carried out in the reactor.

Figure 2:
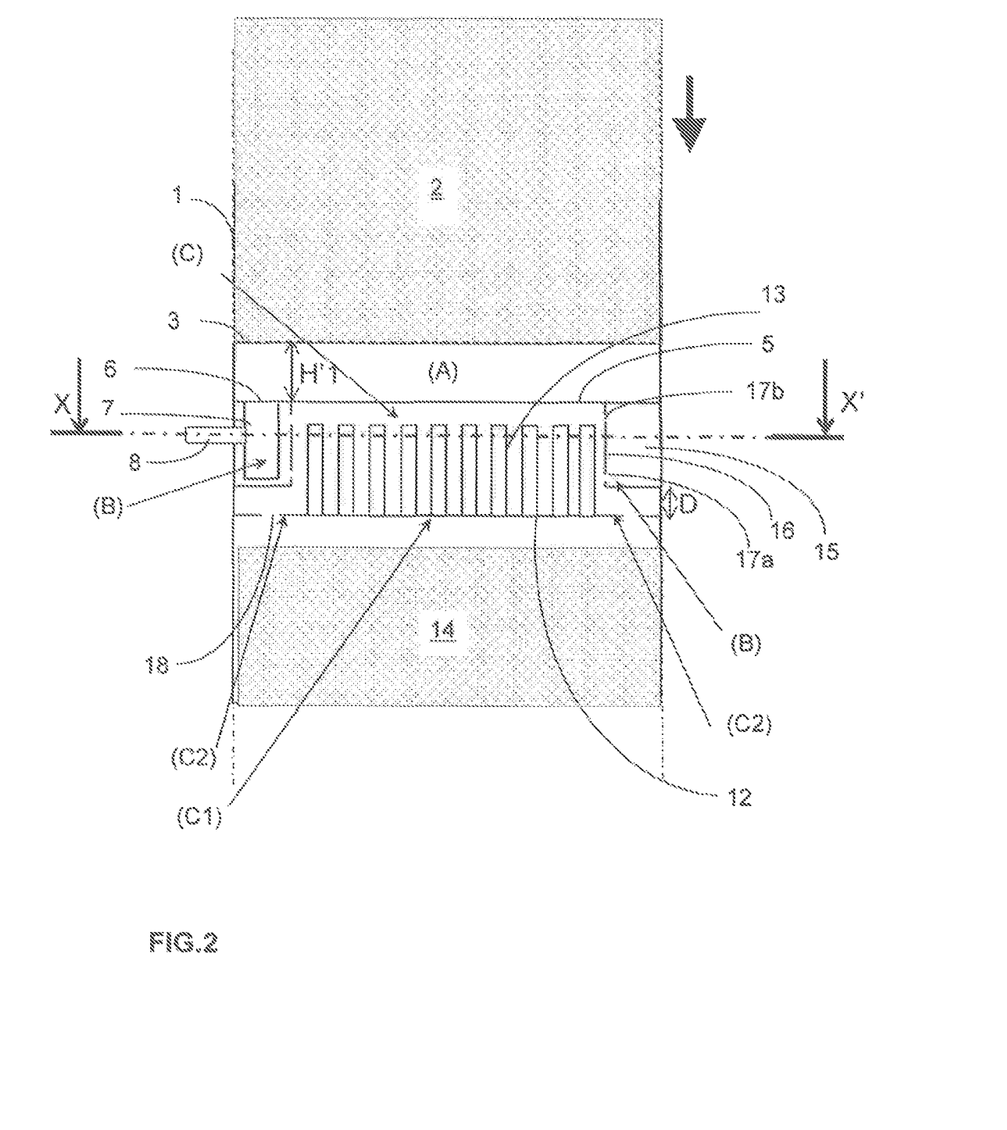
FIG. 2 shows an axial cross-section of a catalytic reactor with a downward flow comprising at least two solid catalyst beds, and comprising a compact device for the mixing and distribution of fluids according to the invention. The arrow in bold represents the direction of flow of the fluids in the reactor.
Figure 3:
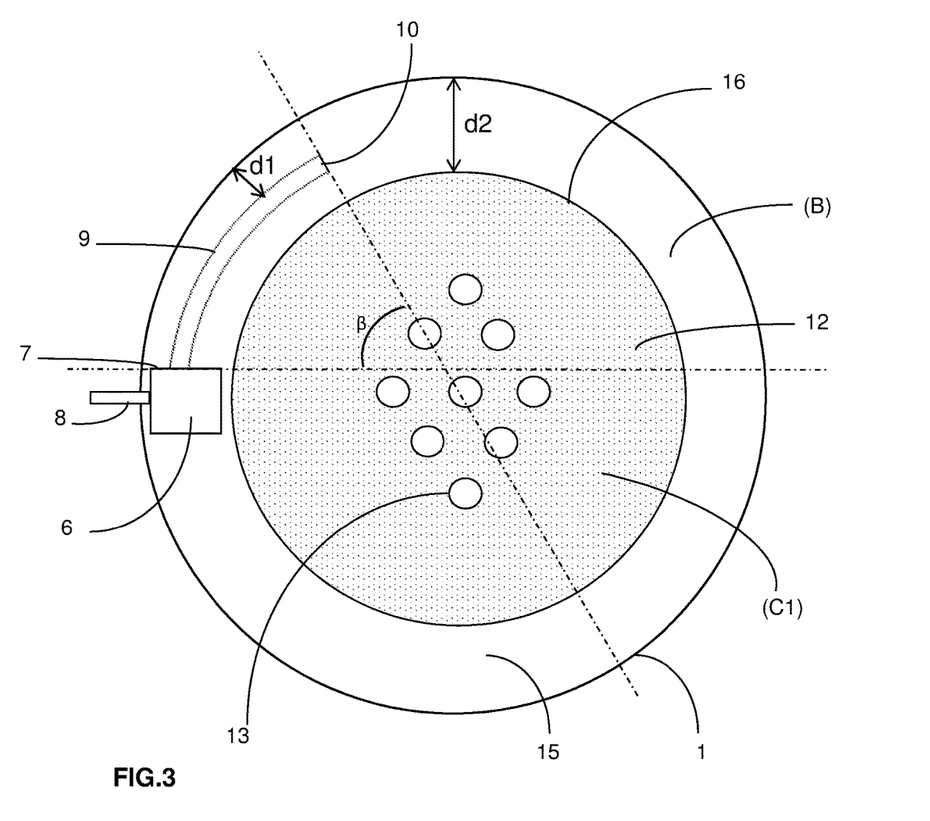
FIG. 3 shows a section of the compact device for the mixing and distribution of fluids along the cross-section shown by the dotted line X-X' in FIG. 2.
Figure 4:
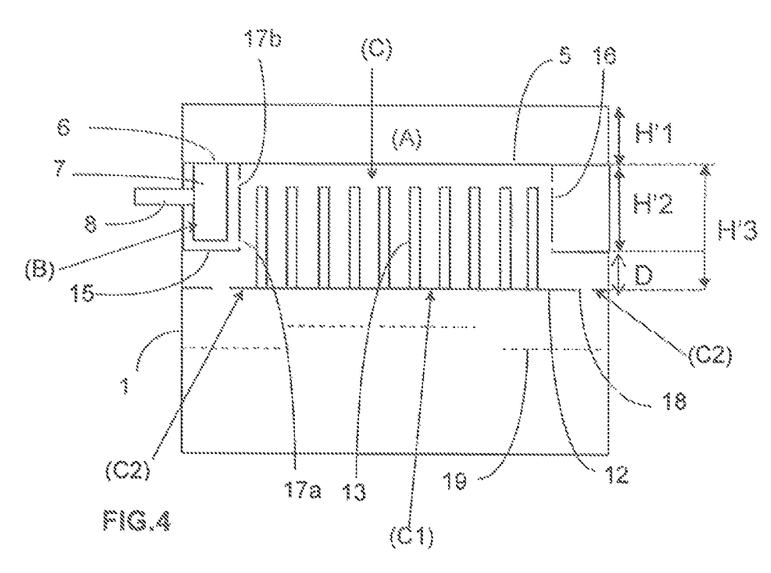
FIG. 4 shows an axial cross-section of the mixing and distribution device according to the invention.

For better understanding of the invention, the description given hereafter by way of an example application relates to a mixing and distribution device used in a reactor suitable for hydrotreatment reactions. The description of FIG. 1 relates to a mixing and distribution device according to the prior art, the description of FIGS. 2 to 4 relates to a mixing and distribution device according to the invention. FIGS. 2 to 4 retain certain elements of FIG. 1; the references in FIGS. 2 to 4 which are identical to those in FIG. 1 denote the same elements. Of course, the device according to the invention can be used, without exceeding the scope of the invention, in any reactor or device and in any field in which it is desirable to obtain good mixing and good distribution of fluids.

Figure 1:
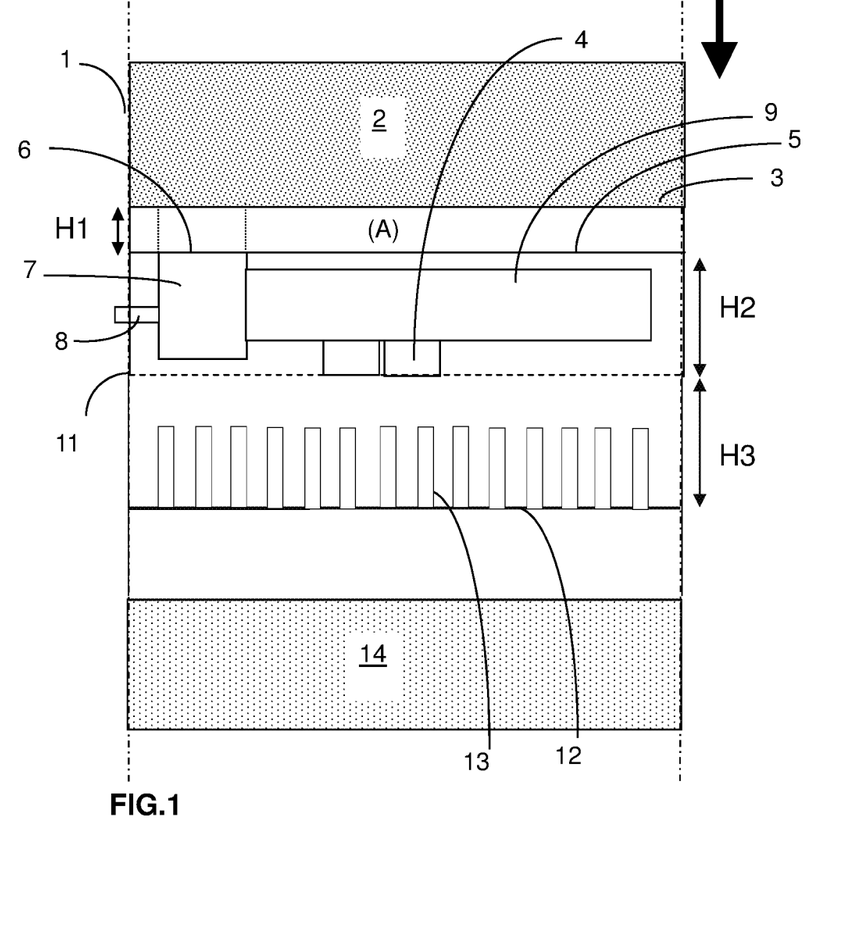
FIG. 1 shows an axial cross-section of a catalytic reactor with a downward flow comprising at least two solid catalyst beds, and comprising a compact device for the mixing and distribution of fluids according to the prior art. The arrow in bold represents the direction of flow of the fluids in the reactor.

FIG. 1 shows a mixing and distribution device according to the prior art arranged in a reactor 1 with a shape that is elongated along a substantially vertical axis in which at least one reaction fluid is circulated from the top to the bottom through two catalyst beds 2 and 14. The reaction fluid can be a gas (or a gas mixture) or a liquid (or a liquid mixture) or a mixture containing liquid and gas. The mixing and distribution device is arranged below the catalyst bed 2, with respect to the flow of the reaction fluid in the enclosure 1. A support grid 3 makes it possible to support the catalyst bed 2 in such a way as to free a collection space (A) below the latter (also called collection zone (A)). The height H1 of the collection space (A) is typically comprised between 10 and 300 mm. This collection space or collection zone (A) makes it possible to collect the flow originating from the catalyst bed 2 at the level of the collection means 5. The collection means 5, also called a baffle, is a solid plate open only at a position 6 for draining the flow of fluid to the annular mixing chamber 9. The reaction fluid originating from the bed 2 is thus forced in the collection zone (A) to pass via the vertical collection line 7 which communicates with the opening 6. A quench fluid is injected into the collection line 7 via an injection line 8. The quench fluid can be liquid or gaseous or a mixture containing liquid or gas. Said chamber 9 is connected by its inlet end to the collection line 7. The quench fluid and the reaction fluid originating from the upper bed 2 are thus forced to enter said chamber 9 in which they mix and are subjected to a swirling flow. At the outlet of said chamber, the mixture of the fluids flows over the pre-distribution plate 11 situated downstream of the mixing chamber 9, in the direction of the circulation of the fluids. Typically, the height H2 (cf. FIG. 1) measured between the collection means 5 and the pre-distribution plate 11 is comprised between 300 and 600 mm. The mixing chamber 9 is positioned on the periphery of the reactor. The gas and liquid phases of the mixture are separated on the perforated plate 11, which is provided with one or more central chimneys 4 configured in order to allow the passage of gas. The liquid passes via the perforations of the plate so as to form a shower-head or rain type flow. The role of the perforated plate 11 is to distribute the flow leaving the mixing chamber 9 in order to supply the distribution plate 12 in a relatively balanced manner, said distribution plate 12 being positioned downstream of the pre-distribution plate, in the direction of circulation of the fluids. Typically, the height H3 (cf. FIG. 1) measured between the pre-distribution plate 11 and the distribution plate 12 is comprised between 100 and 700 mm. The distribution plate 12 comprises chimneys 13, the role of which is to redistribute the gas and liquid phases at the inlet of the catalyst bed 14 situated downstream of this distribution plate.

The mixing and distribution device according to the prior art thus comprises a mixing zone and a distribution zone positioned one above the other, in a stacked manner. The mixing of the fluids is carried out over a height H2 and the distribution of the fluids is carried out over a height H3. As a result, the total space requirement H in the enclosure 1 of a mixing and distribution device according to the prior art is equal to H1+H2+H3 (cf. FIG. 1).

The applicant has developed a new device for the mixing and distribution of fluids, which is more compact than that described previously, having good mixing of the phases and good distribution over the catalyst bed situated below such devices.

FIG. 2 shows a mixing and distribution device according to the invention arranged in a reactor 1 which has a shape that is elongated along a substantially vertical axis in which at least one reaction fluid is circulated from the top to the bottom through at least one catalyst bed 2. The device according to the invention is arranged below the catalyst bed 2, with respect to the flow of the reaction fluid in the chamber 1. A support grid 3 makes it possible to support the catalyst bed 2 so as to free a collection zone (A) arranged below the catalyst bed 2. The collection zone (A) is necessary to allow the reaction fluid to drain to a collection line 7 (which will be described below). The reaction fluid that flows is for example composed of a gas phase and a liquid phase. More particularly, the reaction fluid passing through the catalyst bed 2 upstream is collected by a substantially horizontal collection means 5 (also called here a collection baffle) leading to a substantially vertical collection line 7, arranged either below the collection zone (A) at the level of a zone called mixing zone (B) (as shown in FIG. 2), or at the level of the collection zone (A) (not shown in the figures). By substantially vertical and substantially horizontal, is meant within the meaning of the present invention a variation of a plane with the vertical, respectively the horizontal, by an angle θ comprised between ±5 degrees. The collection means 5 are constituted by a solid plate arranged in the plane perpendicular to the longitudinal axis of the enclosure below the support grid 3 of the catalyst bed 2. The plate of the collection means 5 extends radially over the entire surface of the reactor 1. It comprises at its end an opening 6 to which said collection line 7 is connected. The collection means 5 make it possible to collect the flow of the reaction fluid originating from the catalyst bed 2 upstream and to direct it to said collection line 7. The collection means 5 are distant from the support grid 3 of the catalyst bed 2 by a height H'1. The height H'1 is chosen so as to limit the pressure drop during collection of the fluid flowing from the catalyst bed 2 and to limit the clearance height, i.e. the height formed by the liquid accumulated in the collection means 5. The clearance height does not alter the drainage of the reaction fluid to the collection line 7, its flow in this line, or its flow through the upper catalyst bed 2. When the collection line 7 and the injection means 8 are situated at the level of the mixing zone (B), the height H'1 is comprised between 10 and 200 mm, preferably between 30 and 150 mm, yet more preferably between 40 and 100 mm. Thus, the reaction fluid originating from the bed 2 is forced in the collection zone (A) to pass through the vertical collection line 7. When the collection line 7 and the injection means 8 are situated at the level of the collection zone (A), the height H'1 is comprised between 10 and 400 mm, preferably between 30 and 300 mm, and yet more preferentially between 50 and 250 mm.

Below the collection zone (A) is a mixing zone (B), and a distribution zone (C). The mixing zone (B) comprises a mixing chamber 9 (cf. FIG. 3) situated downstream of the collection means 5 in the direction of circulation of the fluids. The mixing chamber 9 comprises an inlet end directly connected to the collection line 7 and an outlet end 10 for removing the fluids. The technical features of the collection line 7 and the injection means 8 are identical to those of the mixing and distribution device according to the prior art.

As regards the distribution zone (C), it comprises a distribution plate 12 extending radially over the entire section of the enclosure of the reactor. The distribution plate 12 comprises a first zone (C1) supporting a plurality of chimneys 13 and a second zone (C2), situated on the periphery of the enclosure of the reactor.

A characteristic of the present invention is based on placing the mixing zone (B) at the same level as the distribution zone (C), said mixing (B) and distribution (C) zones being delimited by at least one annular wall 16 comprising at least one lateral passage section suitable for the passage of the fluids from said mixing zone (B) to said distribution zone (C).

In a first embodiment variant of the invention, the mixing zone (B) is positioned in an annular enclosure 15 comprising said annular wall 16, on the periphery of the enclosure of the reactor, arranged concentric to the enclosure of the reactor, comprising at least one annular wall 16 internally delimiting said first zone (C1) of the distribution zone (C), preferably substantially cylindrical. The annular wall 16 comprises at least one lateral passage section 17a or 17b suitable for the passage of the fluids from the mixing zone (B) to the distribution zone (C). Preferably, the annular wall 16 comprises at least two lateral passage sections 17a and 17b.

The outlet end 10 of the mixing chamber 9 (cf. FIG. 3) opens into the annular enclosure 15. The configuration of the mixing chamber 9 in the mixing zone (B) allows a tangential flow of the mixture of fluids both in the mixing chamber itself and in the annular enclosure 15, this tangential flow making it possible to optimize the efficiency of the mixing. Thus the mixing of the reaction fluid and the quench fluid continues at the level of the annular enclosure 15. The dimensions of the annular enclosure 15 are chosen in such a way that they allow the rotation of the mixture of the fluids in said annular enclosure 15 before entering the distribution zone (C). According to the invention, the height H'2 of the annular enclosure 15 is comprised between 200 and 800 mm, preferably between 300 and 700 mm, and yet more preferentially between 300 and 600 mm.

In a particular embodiment (not shown in the figures), the annular enclosure 15 can be in sections, i.e. said enclosure comprises two ends. In this embodiment, the length of the annular enclosure 15, defined by the angle formed by the planes passing through the two ends of said enclosure can be comprised between 270 and 360 degrees, preferably between 315 and 360 degrees.

In a particular embodiment (not shown in the figures), the annular enclosure 15 of the mixing zone (B) comprises at least one opening (perforation), preferably a plurality of openings, making it possible to at least partially collect the fluids of the mixing chamber 9 opening into the annular enclosure 15, and to at least partially distribute the fluids on the periphery of the enclosure above the second zone (C2) of the distribution plate 12.

The annular enclosure 15 internally surrounds the first zone (C1) of the distribution zone (C) comprising a plurality of chimneys 13 supported by the distribution plate 12. More precisely, the chimneys 13 are open at their upper end through an upper opening and have a series of lateral holes (not shown in the figures) along their lateral wall. The lateral holes and the upper openings are intended respectively for the separate passage of the liquid phase (via the holes) and the gas phase (via the upper opening) to the inside of the chimneys, so as to carry out their thorough mixing inside said chimneys. The shape of the lateral holes can be very varied, generally circular or rectangular, these holes being preferentially distributed on each of the chimneys on several levels that are substantially identical from one chimney to another, generally at least one level, and preferably from 2 to 10 levels, so as to allow an interface to be established between the gas phase and the liquid phase that is as regular as possible.

The annular enclosure 15 is situated at a distance D from the distribution plate 12, the distance D being comprised between 50 and 200 mm, preferably between 50 and 150 m, and yet more preferentially between 100 and 150 m (cf. FIG. 2 or 4).

Compared with the mixing and distribution device of the prior art, the mixing and distribution device according to the invention does not comprise a pre-distribution plate 11 provided with chimneys. In fact, according to an essential aspect of the device according to the invention, the mixing chamber 9 is positioned at the periphery of the reactor 1, in the mixing zone (B) comprised in an annular enclosure 15, situated at the same level as the distribution zone (C). The mixing and distribution of the fluids is no longer carried out on two separate levels. The mixing and distribution device according to the invention is therefore significantly more compact compared with those known from the prior art. Compared with the device according to the prior art, as shown in FIG. 1, the total space requirement of the mixing and distribution device is H=H'1+H'2+D=H'1+H'3 (cf. FIG. 4), H'2 corresponding to the height of the annular enclosure 15 and H'3=H'2+D.

With reference to FIGS. 2 to 4, the annular enclosure 15 is separated from the distribution zone (C) by a annular wall 16, concentric with the enclosure of the reactor and preferably substantially cylindrical, comprising a plurality of lateral passage sections 17a and/or 17b allowing the passage of the liquid and gas originating from the mixing chamber 9 and circulating in the annular enclosure 15 from the mixing zone (B) to the distribution zone (C). Said lateral passage sections 17a and/or 17b can equally well have the shape of a hole or a slot.

Advantageously, the annular wall 16 separating the mixing zone (B) from the distribution zone (C) is situated at a distance d2 from the enclosure of the reactor 1, the distance d2 being comprised between 2% and 20% of the diameter of the reactor, preferentially between 3% and 15% of the diameter of the reactor, yet more preferentially between 6% and 12% of the diameter of the reactor.

Thus, the annular enclosure 15 is delimited on the outer side by the enclosure of the reactor 1 and on the inner side by said annular wall 16, said annular wall 16 being situated in the space comprised between the enclosure of the reactor 1 and the outermost chimneys 13, i.e. the chimneys 13 distributed substantially following the circle with the largest diameter.

Preferably, the annular wall 16 comprises a plurality of lateral passage sections 17a and/or 17b distributed over at least one level, preferably at least two levels. With reference to FIG. 2, the lateral passage sections 17a allow in particular the passage of the liquid from the mixing zone (B) to the distribution zone (C) and the lateral passage sections 17b allow in particular the passage of the gas from the mixing zone (B) to the distribution zone (C). In the distribution zone (C) of the device according to the invention, the gas and/or liquid phases of the mixture enter said distribution zone (C) by means of the lateral passage sections 17a and 17b situated on the annular wall 16. The distribution plate 12 extends radially over the entire distribution zone (C) of the device and is arranged in the plane perpendicular to the longitudinal axis of the enclosure 1 of the reactor. Said distribution plate 12 makes it possible to optimize the distribution of the cooled reaction fluid over the catalyst bed 14 situated downstream of said distribution plate 12.

Another characteristic of the invention is based on arranging a plurality of openings 18 over the second zone (C2) of the distribution plate 12, situated vertically below the annular enclosure 15, in order to allow good distribution of fluids above the second catalyst bed 14. In fact, the incorporation of the mixing device with the distribution device prevents the presence of chimneys 13 over the entire surface of the distribution plate 12. Thus, the presence of openings 18 on the periphery of the first zone (C1) allows the homogeneous distribution of the fluids on the periphery of the enclosure of the reactor. The openings 18 are preferably situated at a minimal distance from the enclosure of the reactor, said minimal distance being 20 mm. Said openings 18 can equally well be in the shape of a hole or a slot. The number, the size and the shape of the openings 18 are chosen by a person skilled in the art so as to ensure the best possible distribution of the mixture of the fluids on the periphery of the enclosure of the reactor.

In an embodiment according to the invention, the second zone (C2) of the distribution plate 12 can comprise liquid distribution devices (not shown on the figures), in the shape of a tube, provided with lateral passage sections which are holes or slots of any shape. The lower part of said liquid distribution devices communicates with the openings 18 of the second zone (C2) of the distribution plate 12.

With reference to FIG. 3, the mixing chamber 9 has a substantially annular shape and can be a parallelogram or circular section. By parallelogram section is meant any four-sided section of which the opposite sides of said section form a parallel pair, for example the parallelogram section can be a rectangular, square or rhomboid section. By circular section is meant a section in the form of a circle or oval. Regardless of the shape of the section of the mixing chamber 9, the height or the diameter of said chamber will be chosen so as to limit the pressure drop as far as possible and so as to limit the space requirement in the reactor.

The length of the mixing chamber 9 is defined by the angle formed by the planes passing through the two ends of said chamber (represented by the angle β in FIG. 3). The length of said chamber is comprised between 0 and 270 degrees. Preferably, the length of said chamber is comprised between 30 and 180 degrees, more preferentially between 90 and 120 degrees. Advantageously, the mixing chamber 9 is situated at a distance d1 from the enclosure of the reactor 1, said distance d1 being comprised between 5 and 300 mm, preferentially between 5 and 150 mm (cf. FIG. 3).

When the section of the mixing chamber is a parallelogram section, the dimensions of the section of height "h" and width "w", are such that the ratio between the height "h" and the width "w" is comprised between 0.2 and 5.0 preferably between 0.5 and 2.0.

The height "h" of the mixing chamber is chosen so as to limit the pressure drop as far as possible and so as to limit the space requirement in the reactor. In fact, the pressure drop of the mixing device according to the invention depends on the cross-section of the mixing chamber.

When the section of the mixing chamber is a circular section (a circle), the diameter "d" of said mixing chamber is comprised between 0.05 and 0.5 m, more preferentially between 0.1 and 0.4 m, preferentially between 0.15 and 0.4 m, yet more preferentially between 0.15 and 0.25 m, yet more preferentially between 0.1 and 0.35 m. The pressure drop of the device according to the invention depends on the diameter in the mixing chamber.

The pressure drop follows a conventional pressure drop law and can be defined by the following equation:

$$\Delta P = \frac{1}{2}\rho_m V_m^2 \chi \quad (1)$$

where $\Delta P$ is the pressure drop, $\rho_m$ the average density of the gas+liquid mixture in the mixing chamber, $V_m$ the average velocity of the gas+liquid mixture and $\chi$ is the pressure drop coefficient associated with the mixing device. The preferred pressure drop range when dimensioning industrial devices is 0.05 bars<$\Delta P_{max}$<0.5 bars (1 bar=$10^5$ Pa), preferably 0.1 bars<$\Delta P_{max}$<0.25 bars.

According to a particular embodiment of the invention, when the section of the mixing chamber is a parallelogram section, the outlet 10 of the mixing chamber 9 has a height "h'" and/or a width "w'" less than the height "h" and/or the width "w" of the section of the mixing chamber 9 (the outlet excluded) in order to further improve the homogeneity of the mixture. The ratio h'/h and/or l'/l is comprised between 0.5 and 1, preferably between 0.7 and 1.

According to another particular embodiment of the invention, when the section of the mixing chamber is a circular section, the outlet 10 of the mixing chamber 9 has a diameter "d'" less than the diameter "d" of the section of the mixing chamber 9 (the outlet excluded) in order to further improve the homogeneity of the mixture. The ratio d'/d is comprised between 0.5 and 1, preferably between 0.7 and 1.

Advantageously, the mixing chamber 9 can comprise at least one deflecting means (not shown in the figures) on at least one of the internal walls of said mixing chamber. The presence of at least one means of deflecting the mixture of fluids passing through said chamber makes it possible to increase the exchange surface between the two phases and thus the efficiency of the transfers of heat and of material between the liquid phase and the gaseous phase passing through said chamber. Said deflecting means can be presented in several geometrical shapes, making it possible to improve the efficiency of the mixing chamber, it being understood that said shapes allow at least a partial deflection of the path of the mixture of fluids passing through said chamber. For example, the deflecting means can be presented in the form of a chicane, a triangular, square, rectangular, ovoid section or any other shape of section. The deflecting means can also be presented in the form of one or more fixed fin(s) or one or more fixed vanes(s).

In a particular embodiment according to the invention, two mixing chambers 9 can be positioned in the mixing zone (B) in order to reduce the height "h" or the diameter "d" of said mixing chambers, while ensuring good mixing of the fluids and good temperature homogeneity. Preferably, the two mixing chambers are diametrically opposed in the enclosure of the reactor. For each mixing chamber 9, a collection line 7 and an injection means 8 are associated.

Below the distribution plate 12, a dispersal system can be positioned so as to distribute the fluids uniformly over the catalyst bed 14 situated downstream of said system. The dispersal system comprises one or more dispersal devices 19 (cf. FIG. 4) capable of being associated with each chimney 13, being common to several chimneys 13, or also being common to all of the chimneys 13 of the distribution plate 12. Each dispersal device 19 has a substantially planar and horizontal geometry, but can have a perimeter of any shape. Moreover, each dispersal device 19 can be situated at a different height. Advantageously, said dispersal device is presented in the form of grids, and can optionally comprise deflectors.

The distance separating the dispersal system from the bed of granular solids situated immediately below is chosen so as to retain the state of the mixture of the gaseous and liquid phases as far as possible as it is at the outlet of the chimneys 13. Preferably, the distribution plate 12 and catalyst bed 14 situated below said distribution plate is comprised between 50 and 400 mm, preferably between 100 and 300 mm. The distance between the distribution plate 12 and said dispersal device 19 is comprised between 0 and 400 mm, preferably between 0 and 300 mm. In a particular embodiment, the distribution plate 12 is placed on the dispersal device 19.

Of course, the embodiment variant of the invention presented above is only an illustration of the invention, and is in no way limitative. Other embodiment variants of the mixing and distribution device can be envisaged.

For example the distribution zone (C) can be positioned on the periphery of the enclosure of the reactor, internally delimiting the mixing zone (B) by the annular wall 16. In this particular embodiment, the first zone (C1) of the distribution zone (C) is situated on the periphery of the enclosure of the reactor, the second zone (C2) is situated on the inside of said first zone (C1), below the mixing zone (B), at a distance D from the distribution plate 12 comprised between 50 and 200 mm, said second zone (C2) comprising a plurality of openings 18 suitable for the partial passage of the fluids out of said distribution zone (C).

In another embodiment variant of the invention, the mixing zone is comprised in the annular enclosure 15, the position of said annular enclosure being such that it forms two first zones (C1,C'1) each delimited by an annular wall 16 each comprising at least one lateral passage section suitable for the passage of the fluids from said mixing zone (B) to the distribution zone (C), and a second zone (C2) situated below said mixing zone (B) at a distance D from the distribution plate 12 comprised between 50 and 200 mm, said second zone (C2) comprising a plurality of openings 18 suitable for the partial passage of fluids out of said distribution zone (C). In this embodiment variant, the distance "d2" is comprised between the enclosure of the reactor and the wall 16 closest to the enclosure of the reactor, i.e. the wall with the greater diameter.

Compared with the devices described in the prior art, and yet more particularly compared with the device disclosed in the document FR 2 952 835, the mixing and distribution device according to the invention has the following advantages:

an increased compactness due to the integration at the same height of the mixing zone and the distribution zone of the fluids;

good thermal efficiency and good mixing efficiency thanks to the rotary flow in the mixing chamber, in the annular enclosure, and on or at the level of the distribution plate.

EXAMPLE

In the following examples, the device according to the invention (Device B) is compared with a device not according to the invention (Device A). For both devices, it is considered that the heights H1 and H'1 of the collection space (A) are identical and equal to 120 mm. In the same way, the height between the distribution plate 12 and the top of the second catalyst bed 14 is fixed at 400 mm. Comparisons between these two devices are based on their compactness in a catalytic reactor. These examples are given here by way of illustration and in no way limit the scope of the invention.

Device A (Not According to the Invention):

For a reactor with a diameter of 5 m, the space requirement of a conventional mixing device, such as disclosed in the document FR 2 952 835 A1, comprised between the upper end of the collection line 7 and the pre-distribution plate 11 is approximately 650 mm. The space requirement is approximately 950 mm when the space requirement of the distribution plate 12 situated below the pre-distribution plate 11 (corresponding to a height H3=300 mm) is added.

Thus, the total space requirement of a conventional mixing and distribution device taken between the bottom of the first catalyst bed 2 and the top of the second catalyst bed 14 is 120+950+400=1470 mm.

Device B (According to the Invention):

For a reactor with a diameter of 5 m, the height H'2 of the annular enclosure of the device according to the invention is 600 mm and the distance "d2" comprised between the wall 16 of the annular enclosure 15 and the enclosure of the reactor is 350 mm, allowing the rotation of the fluids in the annular enclosure.

The distance D between the annular enclosure 15 and the distribution plate 12 is 150 mm.

The height of the distribution zone H'3 is 750 mm.

Thus, the total space requirement of the mixing and distribution device according to the invention taken between the bottom of the first catalyst bed 2 and the top of the second catalyst bed 14 is 120+750+400=1270 mm. Thus, by way of comparison, the device according to the invention allows a space saving of approximately 14% compared with the device A. The space saved by the compactness of the device according to the invention compared with the device of the prior art can therefore be used for the catalyst beds. Thus the device according to the invention also allows an improvement in the performance of a reactor by increasing the quantity of catalyst in the catalyst beds.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The entire disclosures of all applications, patents and publications, cited herein and of corresponding French Application No. 15/52784, filed Apr. 1, 2015 are incorporated by reference herein.

The invention claimed is:

1. Device for the mixing and distribution of fluids for a catalytic reactor with a downward flow, said device comprising:

at least one collection zone (A) comprising at least one collection means (5);

at least one substantially vertical collection line (7) suitable for receiving a reaction fluid collected by said collection means (5) and at least one injection means (8) opening into said collection line (7) for injecting a quench fluid;

at least one mixing zone (B), situated downstream of the collection means (5) in the direction of circulation of the fluids, said mixing zone (B) comprising at least one mixing chamber (9) connected to said collection line (7) and an outlet end (10) for removing the fluids;

at least one distribution zone (C), situated downstream of said mixing zone (B) in the direction of circulation of the fluids, comprising a distribution plate (12) extending radially over the entire section of the enclosure of the reactor, said distribution plate (12) comprising at least one first zone (C1) supporting a plurality of chimneys (13) and a second zone (C2);

characterized in that said mixing zone (B) is comprised in an annular enclosure (15) situated in the distribution zone (C), said mixing (B) and distribution (C) zones being delimited by at least one annular wall (16) comprising at least one lateral passage section (17a, 17b) suitable for the passage of the fluids from said mixing zone (B) to the first zone (C1) of said distribution zone (C), and in that the second zone (C2) of said distribution zone (C) comprises a plurality of openings (18) suitable for the partial passage of the fluids out of the distribution zone (C).

2. Device according to claim 1, characterized in that said annular enclosure (15) is situated at a distance D from the distribution plate (12) comprised between 50 and 200 mm.

3. Device according to claim 1, characterized in that said annular wall (16) of said annular enclosure (15) is positioned at a distance d2 from the enclosure of the reactor, the distance d2 varying from 2% to 20% of the diameter of the reactor.

4. Device according to claim 1, characterized in that said mixing chamber (9) is positioned at a distance d1 from the enclosure of the reactor, said distance d1 being comprised between 5 and 300 mm.

5. Device according to claim 1, characterized in that the height of said annular enclosure (15) is comprised between 200 and 800 mm.

6. Device according to claim 1, characterized in that the annular wall (16) comprises a plurality of lateral passage sections (17a, 17b) distributed over at least two levels.

7. Device according to claim 1, characterized in that the annular wall (16) of the annular enclosure (15) is substantially cylindrical.

8. Device according to claim 1, characterized in that the cross-section of the mixing chamber (9) is a parallelogram section.

9. Device according to claim 8, characterized in that the section of the mixing chamber (9) presents a ratio between the height "h" of the section and the width "w" of said section comprised between 0.2 and 5.0.

10. Device according to claim 1, characterized in that said mixing chamber (9) is of circular section and is such that the diameter "d" of said mixing chamber is comprised between 0.05 and 0.5 m.

11. Device according to claim 1, characterized in that it comprises two mixing chambers (9).

12. Device according to claim 1, characterized in that said mixing chamber (9) comprises at least one means for deflecting the fluids on at least one of the internal walls of said mixing chamber.

13. Device according to claim 1, characterized in that it also comprises a dispersal system arranged below said distribution plate (12), said dispersal system comprising at least one dispersal device (19).

14. Device according to claim 1, characterized in that said mixing (B) and distribution (C) zones are delimited by two annular walls (16) each comprising at least one lateral passage section (17a, 17b) suitable for the passage of the fluids from said mixing zone (B) to the first zone (C1) of said distribution zone (C).

15. Catalytic reactor with a downward flow comprising an enclosure (1) containing at least two fixed catalyst beds (2, 14) separated by an intermediate zone comprising a device for the mixing and distribution of fluids according to claim 1.

* * * * *